I. C. JENNINGS.
INTERNAL COMBUSTION GENERATOR.
APPLICATION FILED JULY 18, 1907.
1,137,328.
Patented Apr. 27, 1915.
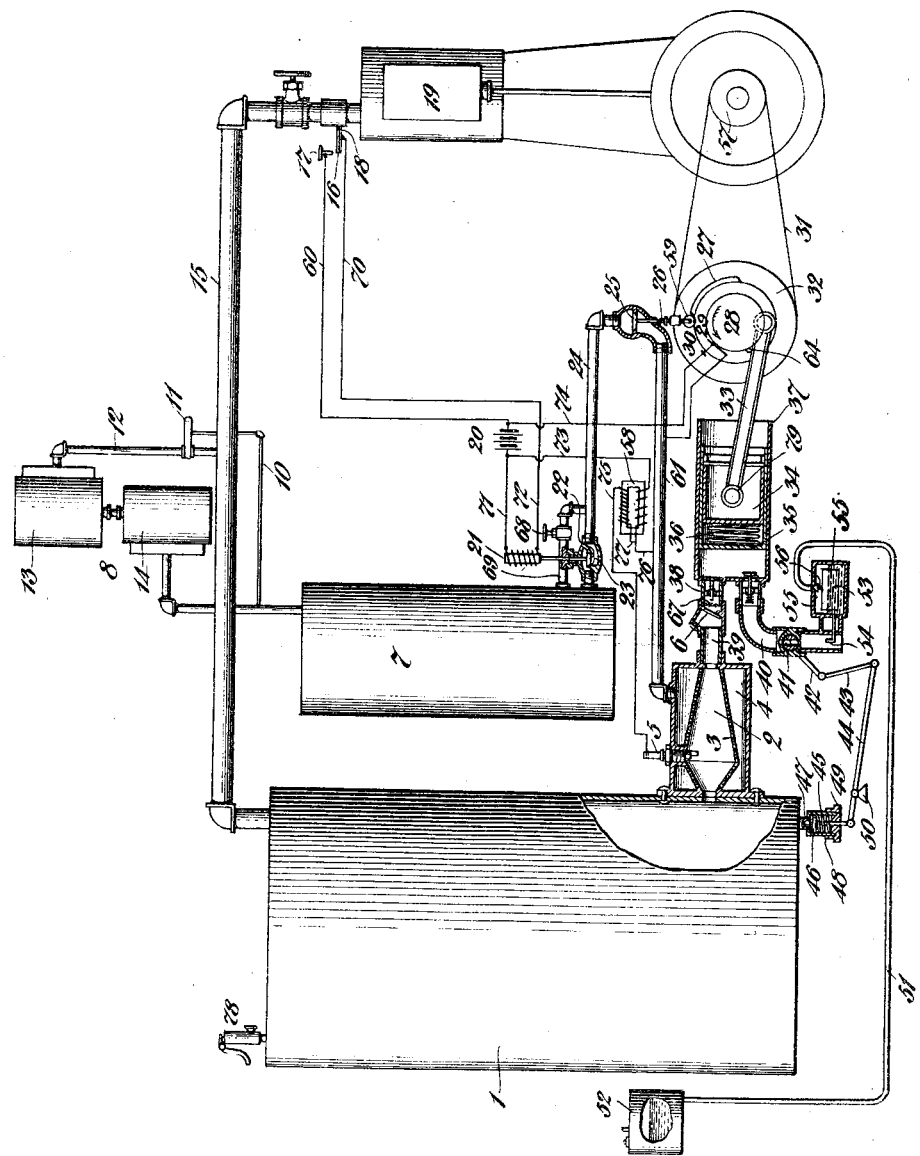

UNITED STATES PATENT OFFICE.

IRVING C. JENNINGS, OF SOUTH NORWALK, CONNECTICUT.

INTERNAL-COMBUSTION GENERATOR.

1,137,328.  Specification of Letters Patent.  Patented Apr. 27, 1915.

Application filed July 18, 1907. Serial No. 384,431.

*To all whom it may concern:*

Be it known that I, IRVING C. JENNINGS, a citizen of the United States, residing at South Norwalk, in the county of Fairfield and State of Connecticut, have invented a new and useful Internal-Combustion Generator, of which the following is a specification.

My invention relates to the burning of oil or gas under pressure in a suitable closed receptacle and expanding the products of combustion of the same to produce power, in any form of engine utilizing the pressure or the velocity, or a combination of both the pressure and the velocity of any gas under pressure. And the objects of my invention are:—first, the generation of power more economically than heretofore has been possible; second, the improvement in control of power produced from the burning of fuel direct and expanding the products of combustion of same in an engine, making said control of power equal to the well known ideal control of the steam engine; and third, to make it possible for any of the forms of reciprocating, rotary or turbine steam engines now on the market to produce power direct from fuel.

As is well known to those familiar with the subject, only a small portion of the available heat in coal, oil or gas as the case may be, is transformed into useful work by any form of engine heretofore known.

The chief losses in the steam engine are due to so-called cylinder condensation and to the loss of the latent heat of the steam, while those of the gas engine may principally be attributed to heat lost to the cooling water or radiated from cylinder walls, if engine is air cooled. The present device largely overcomes the above losses.

In principle, the invention is as follows:—
A combustible mixture is introduced periodically through a valve into a space hereafter designated a combustion chamber, the walls of which are kept below the temperature of ignition of the mixture at the maximum pressure introduced into said combustion chamber by admitting cold air under pressure through small holes in said walls. The said valve is caused to close, and a spark is made to pass in said combustion chamber, igniting the mixture previously introduced which burning increases the volume or pressure or both the volume and the pressure of the gaseous mixture in said combustion space. This gaseous mixture is now stored in a tank provided for the purpose and utilized as wanted in an engine to do useful work, a portion of which work consists in introducing the combustible mixture and compressing the cooling air, while the remainder can be devoted to power purposes. Since the energy in said cooling air due to its pressure is utilized in the engine along with the energy in the products of combustion and since the heat abstracted from the cylinder walls of the combustion chamber by the cooling air is not lost but is used to expand said cooling air, the only losses in the complete cycle are those due to mechanical friction, radiation, and the small losses of efficiency of the compressors and engine due to unavoidable leaks, etc. As the compression of cooling air is conducted as nearly as possible isothermally and radiation reduced to a minimum by proper lagging, these losses are not large; hence the high efficiency of this method of producing power.

My invention, the principle of which has been outlined above, is illustrated somewhat diagramatically in the accompanying drawing, and in which a portion of the parts are shown in section to make clear their internal operation.

Similar numbers refer to similar parts.

"1" is a receptacle capable of sustaining considerable pressure and is used as a storage tank for the products of combustion and cooling air as will transpire later. From this storage tank "1" a pipe "15" leads to an engine "19" which is here indicated as a slide valve reciprocating but which may be rotary, or turbine or any other form of engine formerly worked by steam, or compressed air, or any engine utilizing the pressure, the velocity or both the pressure and the velocity of any gas or liquid under pressure to produce power.

"7" is a tank for compressed air to be used for cooling and scavenging purposes which air may be supplied by any form of air compressor having a pressure regulator adjusted to maintain an air pressure somewhat above the pressure desired in storage tank "1" or to maintain enough pressure to cause a sufficient flow of air from "7" to "1" when valves "22" and "25" to be described later are open. I prefer, however, to connect the power end of the air pump to the tank "1," making the entire mechanism independent of outside power. It is so shown on the drawing.

"8" is the air compressor.

"13" is the power cylinder of same connected to tank "1" by pipes "12" and "15", the former containing automatic pressure regulating valve "11" operated through pipe "10". In order to maintain the pressure in tank "7" greater than that desired in tank "1", the power cylinder "13" of said air compressor is made greater in area than the compression cylinder "14".

"4—2" is the combustion chamber fastened securely and tightly to, and communicating with tank "1". A partition "3" containing a number of small perforations or holes separates the compartment "4" from the compartment "2", the space where actual combustion takes place. This partition "3" is made in the form of two truncated cones with bases adjacent, as shown, for a reason to be brought out later. "5" a spark plug projecting into space "2", is of standard design, and is wired in the conventional manner shown to the induction coil "58", the battery "20" and the commutator "29" mounted on shaft of air compressor "28—37". It will be understood that the form of spark, method of wiring same and source of electric energy is merely a matter of preference. Any method of ignition, properly timed and capable of firing a combustible mixture under pressure will answer the requirements. Thus while the connections shown in the drawing are for a high tension current from a battery, producing a jump spark, a low tension current from a generator and make and break spark would work equally well.

"37—28" is an air or gas pump operated by a belt or by other convenient means from the engine "19", or operated by any other method desired. To the inlet pipe "40" of of the said pump "37—28" is connected a gas or oil carbureter, or a gas producer or any device for supplying a combustible mixture. In the drawing, a float feed carbureter "55" of conventional design piped to an oil tank "52" is shown. On the said suction pipe "40" is a throttle valve "41" connected by suitable links "42, 43, 44" to pressure regulator "48" piped to i. e. controlled by pressure in tank "1". The pressure regulator shown in the drawing is one of the piston type working against an adjustable spring but might be of diaphragm or other well known design. When the pressure in "1" rises above a predetermined amount regulator "48" tends to close throttle "41" causing a diminution of the intake to, and hence the discharge from pump "37—28", to combustion chamber "2". The delivery of compressor "37—28" is led direct to combustion space "2" through pipe "38", screen "67", check valve "6" and pipe "39". The pump "37—28" has two pistons "35, 34" one working within the other, against the action of a spring "36" of adjustable compression which normally holds lug on piston "35" against back of piston "34" as shown, making distance of front or working face of "35" from wrist pin "79" a maximum. When working against a normal pressure in tank "1", these two pistons act as one unit and the piston "35" makes a maximum stroke with the smallest clearance at the end of the compression stroke consistent with good mechanical operation, causing a maximum delivery of combustible material at each compression stroke. As the pressure in boiler "1" rises above the normal or desired pressure, the spring "36" is compressed as piston "34" advances toward the left in the drawing, until the back pressure exerted against "35" is balanced by the increased force of the spring due to its compression at which time piston "35" begins to move with reference to the cylinder wall and delivery to occur. Inasmuch as the length of stroke of piston "35" has become less, the delivery is diminished. As the pressure in tank "1" continues to rise, the spring "36" is compressed more and more with consequent decrease in length of stroke of piston "35" and delivery of combustible gas by pump becomes smaller and smaller with zero delivery as the limit. Thus delivery of pump when pressure in tank "1" is above normal is inversely proportional to that pressure. On suction stroke of pump "37—28" the auxiliary air valve "25" on pipe line connecting tank "7" with combustion chamber "2" is opened by means of cam "27" on shaft of pump engaging roller 59. Valve "22" on same pipe line is controlled by solenoid "21" actuated by electric battery "20", the circuit of which is closed by a thermostat "18" located on pipe line "15" near engine. In order that one battery "20" may serve for ignition as well as for the operation of solenoid "21", the electric contacts of thermostat "18" are insulated from the pipe "15", i. e. from the ground.

The operation of the mechanism described above is as follows:—The shaft of pump "37—28" carrying commutator "29" and transmitting reciprocating motion to wrist pin "79" in piston "34" through connecting-rod "33", is rotated in direction shown by arrow, by any convenient means, as by the introduction of compressed air into engine "19", or by cranking by hand, or making connection to a motor. As the pistons "34" and "35" moving as an integral part go toward the right, a charge of combustible material is drawn into the pipe "40" and on the return stroke compressed and pushed through the check valve "6" into the combustion space "2". As the pistons again start toward the right, the check valve "6" closes automatically; the lug "64" on shaft of pump "37—28" causes the commutator "29" to close the circuit of the battery "20" and coil "58", producing a spark across the points of the spark plug "5" in the combustion chamber "2". The said spark ignites the combustible mixture previously introduced which is prevented from burning back into the compressor by check valve "6". The expansion of the mixture consequent upon its burning in combustion space "2" raises the pressure in tank "1". The process or cycle described above, beginning with suction stroke of the pump and ending with the burning of the combustible mixture is now repeated indefinitely or until the pressure in tank "1" rises to a pre-determined amount, when regulator "48" begins to close throttle valve "41" on inlet pipe "40" of pump, throttling the intake of combustible mixture, and in addition the spring "36" between the pistons "35, 34" is compressed, decreasing the stroke of piston "35" and hence the delivery of pump to combustion chamber "2" as hereinbefore explained. The mixture of gases under pressure in tank "1" may now be used to operate engine "19" which can be devoted to the performance of useful work and may at the same time be used to run the pump "37—28". It is immaterial what form this engine "19" takes. The compressed mixture in tank "1" may also be used to operate the air compressor "8", causing an air pressure to rise and be maintained in tank "7" slightly greater than the pressure in tank "1", the difference in pressure being determined by regulation of automatic valve "11", so that sufficient flow will occur from tank "7" to tank "1" when valves "22" and "25" are open. At each right hand or suction stroke of the pistons "34" and "35" the cam "27" engages the roller 59 and opens the valve "25" on the pipe lines "24, 61" connecting the part of the combustion chamber "4" to air tank "7" but as the valve "22" is closed no air can flow. When the temperature of the gases in tank "1" or of the walls "3" of combustion chamber "2" reaches a pre-determined amount, which maximum temperature is fixed by the necessity of keeping the walls of combustion space cool enough to prevent pre-ignition of the combustible mixture and by the flash point of the oil used to lubricate cylinders of engine "19" and compressor "8", thermostat "18" closes circuits "60, 70, 71, 72" causing solenoid "21" to lift valve "22" which allows air to flow periodically, as valve "25" opens, into space "4" and thence through holes in wall "3", cooling same, into space "2", where said cooling air mingles with and reduces the temperature of gases therein. The introduction of this cooling air further acts as a scavenger of the burnt gases in "2", rendering the combustion of the next entering charge or combustible mixture complete. In this connection the shape of the combustion chamber "2" bears an important relation. As is well known air follows the law of inertia, i. e. when once started it tends to keep moving in a straight line and due to this fact when issuing from an outlet it takes the form of a steep sided cone i. e. diverges only slightly from said outlet as it advances.

The walls "3" of combustion chamber are made to diverge from inlet or pipe "39" to conform as near as possible to form that the incoming gases will assume and then slope together quickly as they approach the outlet or entrance to tank "1". The combustion space "2" is designed to have a volume equal to the volume of combustible mixture delivered by a maximum stroke of the pump "37—28" so that the products of combustion contained in combustion chamber "2" are almost entirely expelled by the incoming combustible mixture which follows the walls "3" closely, due to their shape and is retained by the restricted outlet or entrance to tank "1", the walls adjacent to which having the form of a steep sided cone as shown and described above to avoid pocketing any of the products of combustion and make their entire expulsion possible. The expulsion of the products of combustion is further helped by the introduction of the cooling air into the combustion space "2" through the holes in wall "3" as hereinbefore described. While this cooling air keeps the walls of combustion chamber below ignition point of the incoming mixture preventing pre-ignition when check valve "6" is open, as an additional precaution screen "67" is placed in pipe "38" back of check valve "6" to prevent any burning back should check valve "6" fail to seat or walls get abnormally hot due to failure of cooling air.

Having thus fully described my said invention, what I claim as new, and desire to secure by Letters Patent, is,—

1. In an internal combustion generator, a combustion chamber, means for supplying a combustible charge, and means for introducing charges of said combustible mixture of varying predetermined volumes into said chamber against a variable pressure therein.

2. In an internal combustion generator, a combustion chamber, means for supplying a combustible charge, and a yielding piston for introducing charges of said combustible mixture of varying predetermined volumes into said chamber against a variable pressure therein.

3. In an internal combustion generator, a combustion chamber, means for supplying a combustible charge and means for introducing charges of said combustible mixture of varying predetermined volumes into said chamber against a variable pressure therein, said means comprising a yielding piston having outer and inner members and a spring cushion between the heads of said two members.

4. In an internal combustion generator, a combustion chamber, a pump for supplying a combustible mixture thereto, a storage tank for receiving the products of combustion, means for supplying a cooling medium to said chamber comprising a tank, a compressor for supplying the cooling medium thereto, said compressor being operated by the pressure in the storage tank and regulated by the pressure in the cooling medium tank and means controlled by the temperature of the products of combustion for regulating the supply of cooling medium from its tank to the said chamber.

5. In an internal combustion generator, a combustion chamber, a pump for supplying a combustible mixture thereto, a storage tank for receiving the products of combustion, means for supplying a cooling medium to said chamber comprising a tank, a compressor for supplying the cooling medium thereto, said compressor being operated by the pressure in the storage tank and regulated by the pressure in the cooling medium tank and means controlled by the operation of the mixture pump for regulating the supply of cooling medium from its tank to the said chamber.

6. In an internal combustion generator, a combustion chamber, a pump for supplying a combustible mixture thereto, a storage tank for receiving the products of combustion, means for supplying a cooling medium to said chamber comprising a tank, a compressor for supplying the cooling medium thereto, said compressor being operated by the pressure in the storage tank and regulated by the pressure in the cooling medium tank and means controlled by the temperature of the products of combustion and by the operation of the mixture pump for regulating the supply of cooling medium from its tank to the said chamber.

7. In an internal combustion generator, a perforated combustion chamber, a storage tank connected therewith for receiving the products of combustion, a pump operated by the pressure fluid in said storage tank for supplying a combustible mixture to said chamber, means for preventing the mixture from burning back into said pump, means regulated by the pressure in the storage tank for controlling the amount of mixture supplied to the chamber, means controlled by the operation of the said pump for igniting the mixture within the chamber, a jacket for said chamber and means controlled by the heat and pressure of the pressure fluid and by the operation of said pump for supplying a cooling medium to the said jacket and thence through the said perforations in the walls of the chamber for cooling the chamber and the gases therein.

IRVING C. JENNINGS.

Witnesses:
GEORGE A. JENNINGS,
CHARLOTTE BEARD JENNINGS.